(12) United States Patent
Pottie et al.

(10) Patent No.: US 8,217,319 B2
(45) Date of Patent: Jul. 10, 2012

(54) HEATING CARTRIDGE AND THERMOSTATIC ELEMENT INCLUDING SAME

(75) Inventors: Nicolas Pottie, Sainte Genevieve des Bois (FR); Thierry Maraux, Les Clayes Sous Bois (FR)

(73) Assignee: Vernet, Ollainville (FR)

( * ) Notice: Subject to any disclaimer, the term of this patent is extended or adjusted under 35 U.S.C. 154(b) by 338 days.

(21) Appl. No.: 12/720,011

(22) Filed: Mar. 9, 2010

(65) Prior Publication Data
US 2010/0230399 A1 Sep. 16, 2010

(30) Foreign Application Priority Data
Mar. 11, 2009 (FR) ...................................... 09 51524

(51) Int. Cl.
*H05B 3/02* (2006.01)
(52) U.S. Cl. ......... 219/482; 219/493; 219/541; 219/552
(58) Field of Classification Search .................. 219/482, 219/493, 496, 507, 508, 509, 510, 511, 512, 219/513
See application file for complete search history.

(56) References Cited

U.S. PATENT DOCUMENTS

| 4,358,667 | A | * | 11/1982 | Johnson et al. ............... 392/498 |
| 7,275,697 | B2 | | 10/2007 | Roman et al. |
| 2010/0230504 | A1 | * | 9/2010 | Pottie et al. ................. 236/93 R |

FOREIGN PATENT DOCUMENTS

| FR | 2853709 | 10/2004 |
| FR | 2905820 | 3/2008 |

* cited by examiner

*Primary Examiner* — Tan T. Nguyen
(74) *Attorney, Agent, or Firm* — Dowell & Dowell, PC

(57) ABSTRACT

This heating cartridge (1) includes a thermally conductive tube (2) to be immersed in a thermo-expandable substance of the thermostatic element, electric heating element (3), arranged inside the tube and provided with wires for conducting an electric current supplied by an external current source, and connection element between the wires and ports (7) powered by the external current source, these connection element comprising a support base (4) integral with the tube. In order to facilitate the electric connection between the wires and the ports and make it more reliable, the connection element comprise coupling pieces (6), supported by the support base and designed to pinch each port against the corresponding wire.

10 Claims, 3 Drawing Sheets

HEATING CARTRIDGE AND THERMOSTATIC ELEMENT INCLUDING SAME

The present invention relates to a heating cartridge for a thermostatic element. It also relates to a thermostatic element including such a cartridge.

In many applications of the fluidics field, in particular for cooling of thermal engines of vehicles, thermostatic valves are used to distribute a fluid entering into different circulation channels, depending on the temperature of that fluid. These valves are called thermostatic in the sense that the movement of their internal plug(s) is controlled by a thermostatic element, i.e. an element which comprises a cup containing a thermo-expandable substance and a piston which is slidingly displaceable with respect to the cup under the action of the thermo-expandable substance during the expansion thereof.

In order to distribute the fluid depending on other parameters, in particular conditions outside the valve such as the ambient temperature or the load of the vehicle propelled by the engine equipped with the valve, it is known to integrate an electric cartridge into the valve to heat the thermo-expandable substance, which makes it possible to steer the valve from the outside thereof, independently or as a complement to the temperature of the entering fluid, in particular using a computer onboard the vehicle and programmed appropriately. In practice, the heating cartridge comprises electric heating means, such as a heating resistor, arranged inside the aforementioned piston or a similar tube: by immobilizing, for example, the piston at the external case of the valve, the electrical supply of the resistor causes an increase in temperature of the thermo-expandable substance, which causes, through expansion of the latter part, the sliding of the cup around the piston, a plug being supported by said cup to act on the circulation of the fluid through the valve.

In order to electrically supply the heating means, the cartridge comprises connectors to electrically connect electric conduction wires, belonging to the heating means, and charge ports connected to an external current source. These connectors are supported by a base integral with the tube, this base thus undergoing, at least in part, the strains absorbed by the piston during use. Under these conditions, the mechanical and therefore electric connection between the heating cartridge and the charge ports can be defective depending on the strains undergone by the base, in particular over time. Furthermore, the operation making it possible to make the connectors integral with the wires of the heating means, generally by welding or crimping, is delicate to carry out. This type of operation makes the manufacture of the cartridge complex and costly.

The aim of the present invention is to propose a heating cartridge whereof the connection with an external current source is easy and economical to carry out, while being resistant and reliable, particularly over time.

To that end, the object of the invention is a heating cartridge for a thermostatic element, including:
- a thermally conductive tube adapted to be immersed in a thermo-expandable substance of the thermostatic element,
- electric heating means, arranged inside the tube and provided with at least one conduction wire of an electric current supplied by an external current source, and
- connection means between the wire and a port powered by the external current source, these connection means comprising a support base integral with the tube, characterized in that the connection means comprise at least one coupling piece which is supported by the support base and which includes a plate from which deformably extends at least one elastic blade for pinching the port against the plate, with interposition of the wire.

The basic idea of the invention is to avoid electrically connecting the wires and the ports through an additional operation beyond that implemented to place these wires and these ports but, on the contrary, to obtain a direct electric contact between them during this placement. To that end, the invention provides for pinching each port against the associated wire using a coupling piece. The pinching is advantageously obtained during the placement of the ports opposite the heating cartridge, inasmuch as the coupling piece is suitably supported by the base. In practice, the stress necessary for the engagement of the terminals with the coupling piece is limited. Over the long term, the pinching effect provided by the coupling piece is advantageously stable and therefore reliable, which makes the electric connection between the wires and the ports lasting. Moreover, this pinching effect is effectively obtained with various port shapes and thicknesses, which makes the heating cartridge adaptable to a very large number of installations, which needing specific modifications or developments. Thus, the heating cartridge according to the invention is effective, reliable and economical.

According to other advantageous features of this heating cartridge, considered alone or according to all technically possible combinations:
- the plate and the or each blade of the coupling piece define between them a free volume for receiving the port, and the face of the plate, which is opposite to said free volume, is pressed against a complementary wall of the base, while the wire is folded down against the other face of the plate by the port pinched by the blade;
- the free end of the or each blade is configured in an edge inclined toward the plate in the direction of the rest of the blade;
- the connection zone between the plate and the or each blade is received in an essentially complementary housing defined by the base so as to advantageously jam the coupling piece opposite with regard to the base;
- the base defines at least one surface for guiding the port toward the free volume(s);
- the blades are separated by a free passage dimensioned to be traversed by the wire when the latter part is folded down against the plate;
- the base defines a slot for passage and guiding of the wire toward said free passage when the wire is folded down against the plate;
- the coupling piece is made of stainless steel.

Another object of the invention is a thermostatic element, including a heating cartridge, as defined above, and a cup containing a thermo-expandable substance in which the tube of the heating cartridge is immersed.

The invention will be better understood upon reading the description which follows, provided solely as an example and done in reference to the drawings in which.

Figure 1:
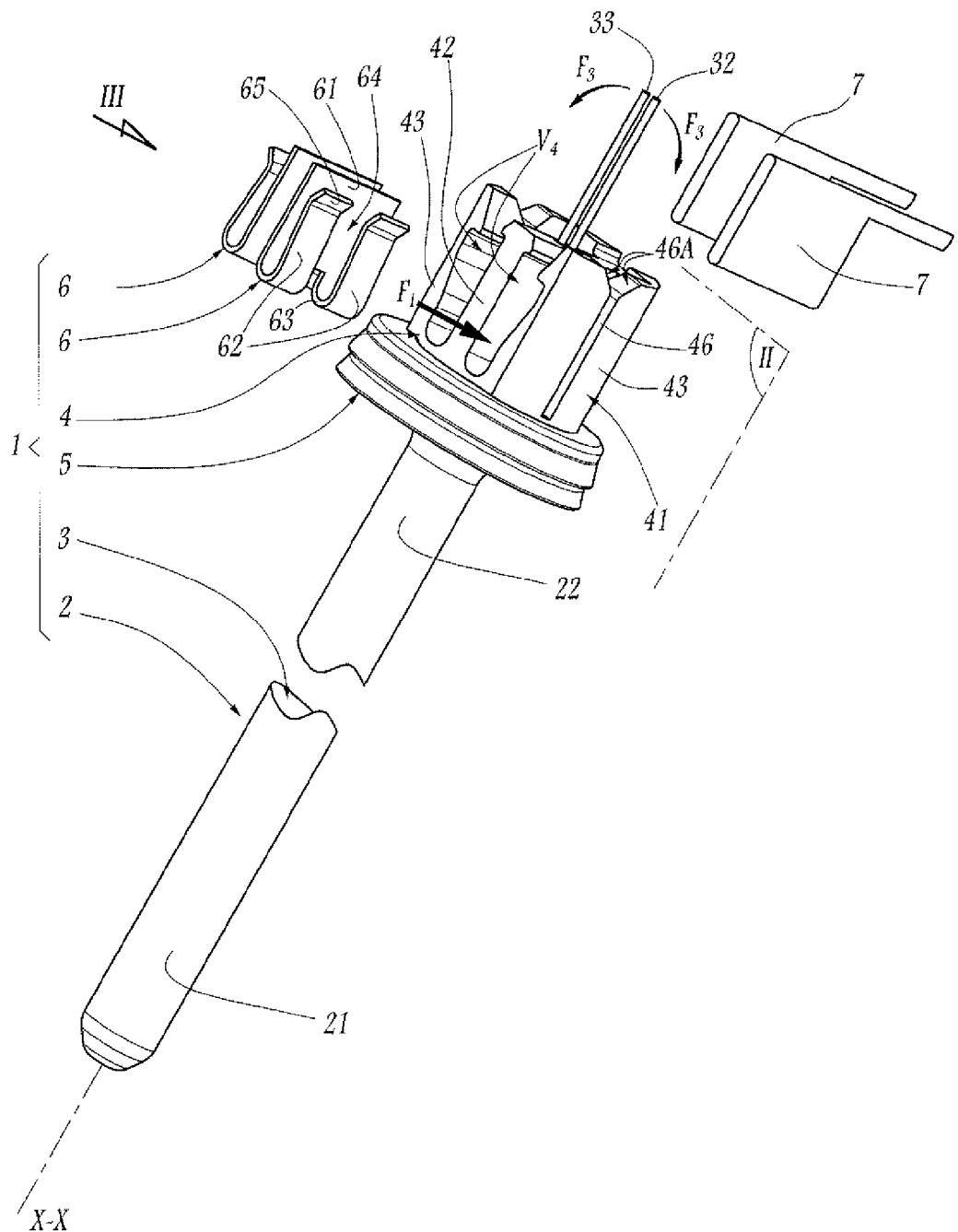
FIG. 1 is an exploded perspective view of a heating cartridge according to the invention, associated with electric power ports.
Figure 2:
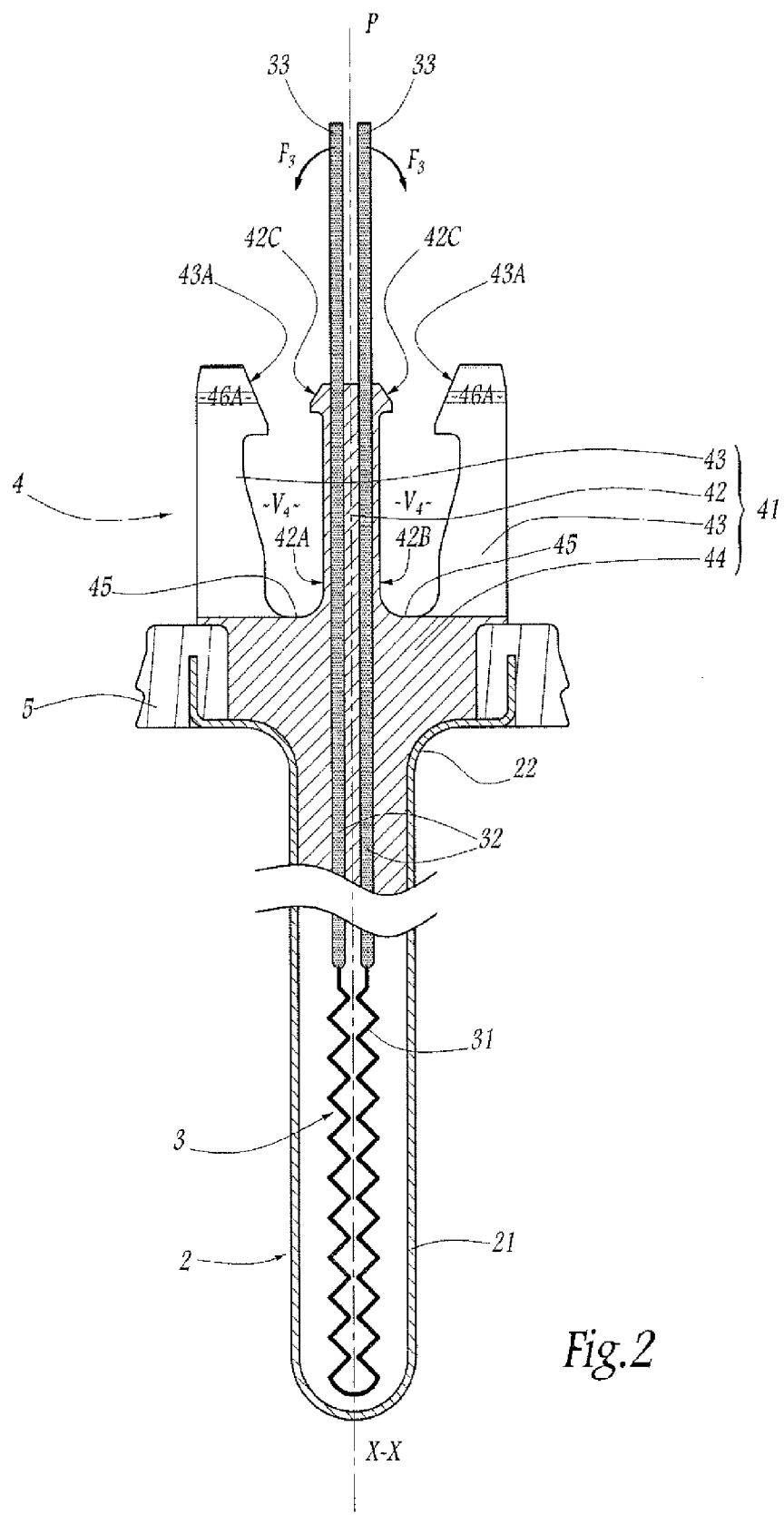
FIG. 2 is a cross-section along plane II of FIG. 1.
Figure 3:
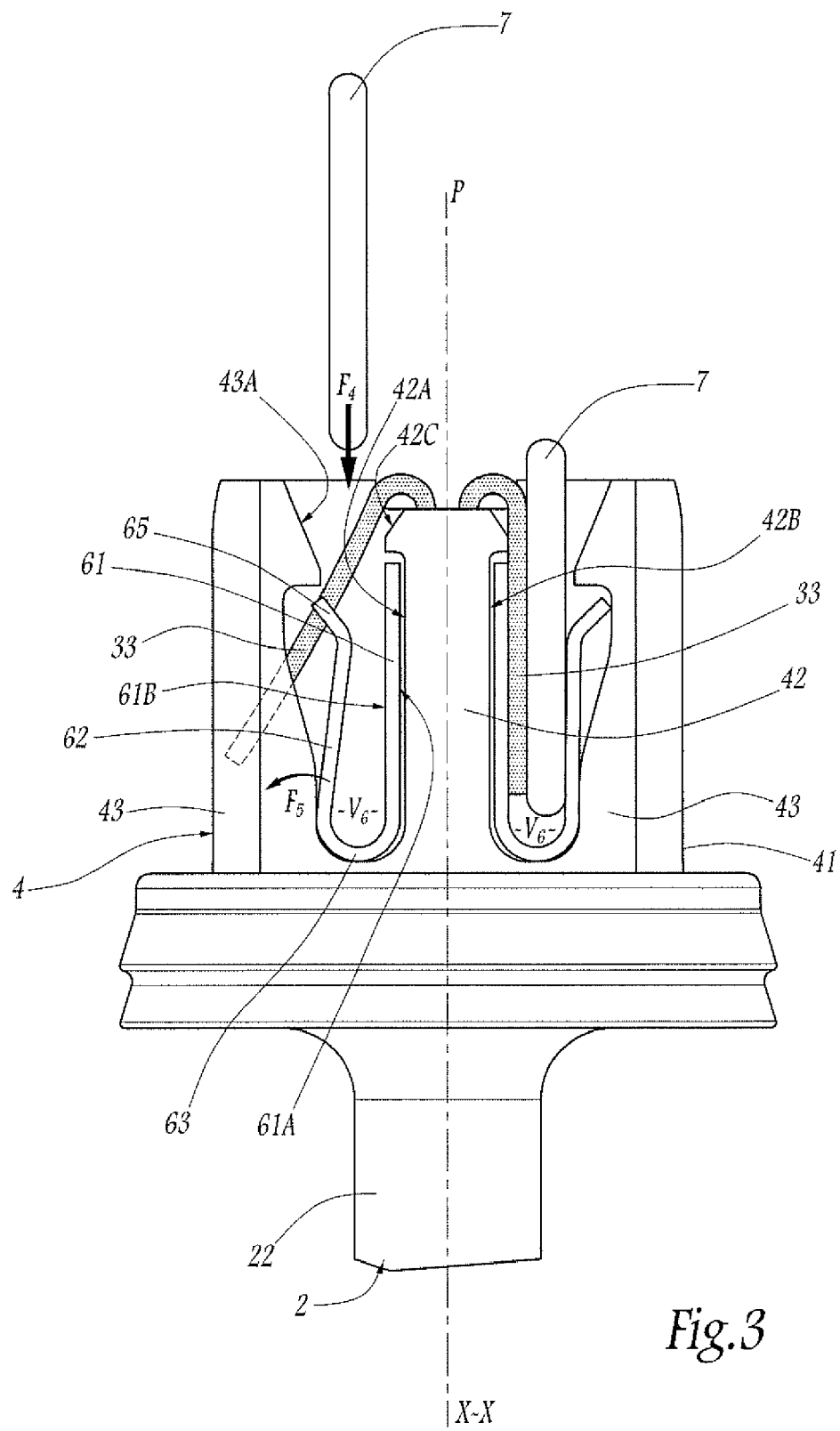
FIG. 3 is an elevation view along the arrow III of FIG. 1, showing in part the cartridge in an assembled state, associated with electric power ports, before and after placement of these ports for the left and right portions of this FIG. 3, respectively.

FIGS. 1 to 3 illustrate a heating cartridge 1 comprising a metal tube 2 centered on a longitudinal axis X-X, here with a circular base. An electric heating resistor 3 is arranged inside the tube 2, such that the main heating body 31 of this resistor occupies the end portion 21 of the tube, turned downward in the figures. During use, this end portion 21 of the tube 2 is immersed in a thermo-expandable substance contained in a cup, not shown, of a thermostatic element, in order to be heated by the heating body 31.

For convenience, the continuation of the description is oriented in relation to the axis X-X: the terms "lower" and "bottom" describe an axial direction oriented toward the end portion 21 of the tube 2, while the terms "upper" and "top" describe an opposite direction.

In its upper end portion 22, the tube 2 is integral with a base 4 which closes the upper end of the tube. In practice, various forms of connection between the tube 2 and the base 4 can be considered: for example, the base can be forcibly pushed into the end portion 22 or be overmolded and/or adhered to said end portion. Advantageously, the connection between the tube 2 and the base 4 is sealed by a peripheral gasket 5.

The main body 41 of the base 4 is traversed all the way through, along the direction of the axis X-X, by two electric conduction wires 32 coming from the main heating body 31 of the resistor 3. The wires 32 thus extend in length from the end portion 21 of the tube 2, where they are connected to the heating body 31, or constitutes the ends thereof, until the outside of the tube 2, passing through the end portion 22, at which they axially traverse the main body 41 from which they emerge upward, respectively forming free ends 33.

The body 41 of the base 4 includes a globally parallelepiped wall 42, whereof the opposite planar faces 42A and 42B, separated from each other by the thickness of the wall 42, extend parallel to a geometric plane P containing the axis X-X. In the embodiment considered here, this plane P constitutes a plane of symmetry of the wall 42 and, more generally, for all of the body 41 of the base 4, as well as for the wires 32 which extend inside the wall 42, parallel to its faces 42A and 42B.

The base body 41 also includes two side walls 43 situated on either side of the wall 42, respectively, and opposite faces 42A and 42B of the latter part along a direction perpendicular to said faces. Here, the walls 43 are symmetrical to each other in relation to the plane P.

The central wall 42 and the side walls 43 extend upward from a lower base 44 of the body 41, at least partially housed inside the end portion 22 of the tube 2. The walls 42 and 43 are thus placed above, along the axis X-X, the axial level of the upper end of the tube 2, as well as, here, the upper end of the gasket 5. In this way, the free volumes $V_4$ defined between the wall 42 and, respectively, the two walls 43 are accessible from the outside along a direction globally orthoradial to the axis X-X, possibly on both sides of the body 41 along this orthoradial direction. Each free volume $V_4$ is also accessible from the outside through the top, inasmuch as these free volumes $V_4$ open freely onto the upper face of the body 41, while, toward the bottom, these free volumes are closed by the base 44.

For reasons specified below, the upper ends of the walls 42 and 43 present planar surfaces 42C and 43A inclined in relation to the axis X-X, which are configured to converge toward the inside of the corresponding free volume $V_4$, toward the base 44.

The heating cartridge 1 also comprises two attached pieces 6, identical to each other and adapted to be mounted on the base 4, while being received respectively in the free volumes $V_4$, as shown in FIG. 3, here symmetrically in relation to the plane P. As is clearly visible in FIG. 1 for one of these pieces 6, each piece includes a parallelepiped plate 61 dimensioned so that one, referenced 61A, of its two main faces 61A and 61B, separated from each other by the thickness of the plate, bears in a complementary manner against the corresponding face 42A or 42B of the wall 42, along a direction perpendicular to said face, as shown in FIG. 3. The piece 6 also includes two curved blades 62, arranged opposite the face 61B of the plate 61 and connected deformably, by a curved connecting zone 63, to an end section of the plate 61, end section designed to be turned downward when the piece 6 is assembled to the base 4. The two blades 62 are arranged one behind the other along the aforementioned end section, while being thus separated from each other by a free passage 64 (FIG. 1).

The free end of each blade 62 is configured in an edge 65 inclined toward the face 61B of the plate 61 in the direction of the rest of the blade. The free volume $V_6$ defined between the plate 61 and each of the blades 62 thus successively presents, when one travels over the blade from its edge 65 to the connecting zone 63, a constriction and a flare, at the edge 65 and the rest of the blade 62, respectively. Furthermore, each of the free volumes $V_6$ is closed by the connecting zone 63, while, opposite, this free volume is freely open on the outside.

In practice, the pieces 6 are realized in a material having a certain mechanical resistance, while authorizing the elastic deformation of the connecting zones 63. Advantageously, the pieces are thus made of stainless steel, which has the additional advantage of having good corrosion resistance. Each piece 6 is obtained by cutting and folding a steel sheet.

The assembly of each piece 6 to the base 4 is as follows.

As indicated by arrow $F_1$ in FIG. 1, each piece 6 is introduced into one of the free volumes $V_4$ of the base 4, along a direction orthoradial to the axis X-X. During that placement, the face 61A of the plate 61 is pressed and slides against the corresponding face 42A or 42B of the wall 42 of the base 4, until the plate 61 is centered against said face 42A or 42B. At the same time, the blades 62 are thus brought opposite the corresponding side wall 43, while the connecting zones 63 are thus placed at the bottom of the free volumes $V_4$, while being received in complementary housings 45 (FIG. 2), respectively, defined by the base 44 of the base body 41. Each of these housings 45 is advantageously dimensioned to cause a certain mechanical resistance of the piece 6, by jamming in said housing.

Once each piece 6 is thus centered in the corresponding free volume $V_4$ of the base 4, the free end 33 of the wire 32 situated on the same side of the plane P as said free volume $V_4$ is folded downward, as indicated by the arrow $F_3$ in FIGS. 1 and 2, until it is placed opposite the face 61B of the plate 61, as shown in FIG. 3. When the wire end 33 goes from its rectilinear configuration of FIG. 2 to its configuration folded down at more than 90° of the left part of FIG. 3, it traverses a through slot 46, defined to that end through the corresponding side wall 43, until it is positioned through the free passage 64 between the two blades 62. Advantageously, the edges opposite the slot 46 have, at their upper end, surfaces 46A which converge toward each other, making it possible to guide the introduction of the wire end 33 into the rest of the slot 46, during the folding movement of said wire end.

At the end of the assembly of the two pieces 6 to the base 4, the heating cartridge 1 is as shown in FIG. 3. In particular, to prevent them from disengaging, the two pieces 6 are retained in the free volumes $V_4$ of the base 4 by the folded down ends 33 of the two wires 32, positioned between the two blades 62, as well as advantageously by the jamming in the housings 45. In this assembly configuration, the inclined surfaces 42C and 43A, defined at the upper end of the base body 41, open downward inside the free volumes $V_6$ of the piece 6: more precisely, as clearly visible in the left part of FIG. 3, each surface 42C opens downward on the upper end of the face 61B, while each surface 43A opens downward on the upper end of the edges 65 of the strips 62.

The use of the heating cartridge 1 for electrically powering the heating resistor 3 is as follows.

One considers that one has a current source, not shown, external to the cartridge 1. This current source powers two ports 7, partially illustrated in FIGS. 1 and 3. In practice, these ports 7 can assume various forms, being globally similar to a rhomb, as shown diagrammatically in FIG. 1.

The ports 7 are introduced into the free volumes $V_6$ of the piece 6, as indicated by the arrow $F_4$ in FIG. 3. In practice, the direction in which the heating cartridge 1 and the ports 7 come closer together is unimportant, i.e. the cartridge 1 can be brought closer to each port 7 and/or each port 7 can be brought closer to the cartridge, in order to connect said port to the heating resistor 3.

In any case, the port 7 is received inside free volumes $V_6$, being introduced there from their upper opening. To that end, the port 7 is guided by the inclined surfaces 42C and 43A of the base 4. By continuing this movement of introduction of the port 7, the latter part is pressed against the edges 65 of the blades 62, which then tend, on one hand, to guide the port 7 toward the plate 61 and, on the other hand, to move away from said plate, through elastic deformation of the connecting zones 63, as indicated by the arrow $F_5$ in FIG. 3. Once the port 7 has crossed the edge 65, its introduction into the free volumes $V_6$ continues, until, for example, the port 7 and the plate 61 are globally centered one against the other, as shown in the right portion of FIG. 3. Thus, the port 7 is pinched by the blades 62 against the plate 61, under the elastic strain related to the deformation of the connecting zones 63.

Given the presence of the end 33 of each wire 32, folded down opposite the face 61B of the plate 61, said wire end 33 is driven by the port 7 toward the plate 61, until it is interposed bearing between the plate 61 and the port 7 pinched against said plate by the blades 62. Thus, the wire 32 is electrically connected to the port 7, by direct contact between its end 33 and said port, direct contact which is firmly maintained under the pinching effect obtained by the piece 6. In other words, each piece 6 provides a mechanical coupling between the support base 4 and the corresponding port 7, all while permitting the direct electric connection between said port and the corresponding wire 32 of the heating resistor 3.

The pinching of the ports 7 by the coupling pieces 6 is both reliable and stable over time, owing to the spring effect related to the elastic deformation of the connecting zones 63. This pinching therefore guarantees a high-performance electric connection between the wires 32 and the ports 7, for various shapes and thicknesses of the ports.

Various developments and variations of the heating cartridge 1 described above can also be considered. For example:
- a single blade 62 can be provided per coupling piece 6; and/or
- in addition to the two coupling pieces 6 used for the connection between the heating resistor 3 and the external current source, at least one other similar coupling piece can be integrated into the base 7 to pinch the port of a sensor, for example a temperature sensor, against a wire coming from inside the tube of the cartridge.

The invention claimed is:

1. A heating cartridge for a thermostatic element, including:
   a thermally conductive tube adapted to be immersed in a thermo-expandable substance of the thermostatic element,
   electric heating means, arranged inside the tube and provided with at least one wire for conducting an electric current supplied by an external current source, and
   connection means between the wire and a port powered by the external current source, these connection means comprising a support base integral with the tube, wherein the connection means comprise at least one coupling piece which is supported by the support base and which includes a plate from which deformably extends at least one elastic blade for pinching the port against the plate, with interposition of the wire.

2. The cartridge according to claim 1, wherein the plate and the at least one elastic blade of the coupling piece define between them a free volume for receiving the port, and wherein the face of the plate, which is opposite to said free volume, is pressed against a complementary wall of the base, while the wire is folded down against the other face of the plate by the port pinched by the at least one elastic blade.

3. The heating cartridge according to claim 2, wherein the support base defines at least one surface for guiding the port toward the free volume(s).

4. The heating cartridge according claim 1, wherein a free end of the at least one elastic blade is configured in an edge inclined toward the plate in the direction of the rest of the at least one elastic blade.

5. The heating cartridge according to claim 1, wherein a connecting zone between the plate and the at least one elastic blade is received in an essentially complementary housing defined by the support base.

6. The heating cartridge according to claim 5, wherein a housing is defined by the support base so as to jam the coupling piece with respect to the support base.

7. The heating cartridge according to claim 1, including a plurality of blades separated by a free passage dimensioned to be traversed by the wire when the latter part is folded down against the plate.

8. The heating cartridge according to claim 7, wherein the support base defines a slot for the passage and guiding of the wire toward said free passage when the wire is folded down against the plate.

9. The heating cartridge according to claim 1, wherein the coupling piece is made of stainless steel.

10. A thermostatic element, including a heating cartridge according to claim 1, and a cup containing a thermo-expandable substance in which the tube of the heating cartridge is immersed.

* * * * *